Patented Nov. 28, 1944

2,364,030

UNITED STATES PATENT OFFICE 2,364,030

MINERAL OIL COMPOSITION

George H. S. Snyder and Everett W. Fuller, Woodbury, N. J., assignors to Socony-Vacuum Oil Company, Incorporated, New York, N. Y., a corporation of New York No Drawing. Application January 28, 1942, Serial No. 428,551

8 Claims. (Cl. 252—59)

This invention has to do with the stabilization of viscous mineral oil fractions against the deleterious effects of oxidation or deterioration with use by the addition thereto of oxidation-inhibitors. More specifically, the present invention is directed to the improvement of viscous mineral oil fractions by the use of novel compounds, or a novel class of compounds, which when admixed with a viscous mineral oil in minor proportions will prevent or delay undesirable changes taking place in the oil.

It is well known to those familiar with the art that substantially all the various fractions obtained from mineral oils and refined for their various uses are susceptible to oxidation. The susceptibility of an oil fraction to oxidation and the manner in which oxidation manifests itself within the oil varies with the type and degree of refinement to whch the oil has been subjected and with the conditions under which it is used or tested. Thus, the products formed in an oil fraction as a result of oxidation and the degree to which they are formed depends upon the extent to which the various unstable constituents or constituents which may act as oxidation catalysts have been removed by refining operations and also upon the conditions of use.

The present invention is predicated upon the discovery that low molecular weight coumarone-indene polymers are effective oxidation-inhibitors of viscous mineral oil fractions. More particularly, this invention contemplates the use of coumarone-indene polymers of molecular weight of less than 600, and preferably of molecular weight of from about 330 to about 450, said polymers being present in small amounts to stabilize viscous mineral oil fractions against the deleterious effects of oxidation without appreciably changing their physical properties.

We are aware of the fact that it has been proposed to use high molecular weight hydrocarbon polymers to increase the viscosity and improve viscosity index characteristics of viscous oils. British Patent 379,717, for example, mentions numerous polymerized compounds, including polymerized indene, but the polymers disclosed therein are of high molecular weight in excess of 800, and preferably more than 2000. We have found that these high molecular weight polymers are difficult to dissolve or disperse in hydrocarbon oils, and because of their limited solubilities in such oils they are necessarily suspended in the oils in colloidal form. Thus, the high molecular weight polymers proposed in the prior art could not be used to advantage in turbine oils, for the colloidal solutions would be objectionable because of their tendency to form emulsions with the water that is present. As one object of this invention we contemplate using the hereinbefore-described low molecular weight polymers in turbine oils, for these polymers are readily soluble in turbine oils. We have found, too, that the high molecular weight polymers of the type hereinabove referred to have but little ability to retard oxidation of hydrocarbon oils.

As aforesaid, the low molecular weight polymers contemplated herein are of molecular weight of less than 600, and the present invention is predicated upon the discovery that these low molecular weight polymers possess oil-improving properties which are not present in the high molecular weight polymers discussed above. For example, as distinguished from the high molecular weight polymers heretofore proposed, the low molecular weight coumarone-indene polymers contemplated herein are readily soluble in hydrocarbon oils, and are of much greater effectiveness in retarding oxidation of such oils. Also, the low molecular weight coumarone-indene polymers may be employed in small amounts to retard oxidation of the oil without changing its physical properties of viscosity, pour point, etc. This is important where an oil has been refined to meet certain physical specifications and it is desirable to add an inhibitor without changing the physical characteristics of the oil.

The low molecular weight polymers contemplated herein may be obtained by polymerization of pure coumarone, or indene, or a mixture of the two, or by polymerization of the coal tar distillate fraction that contains these materials. The usual commercial methods of otbaining these products consists of polymerizing the coal tar fraction that boils from about 150° C. to about 200° C. by treatment with a small amount of sulphuric acid or other catalyst (see "The Chemistry of Resins," by Carleton Ellis, 1935 edition, vol. I, page 106). The degree of polymerization depends upon the amount of catalyst used and the method of treatment, and we prefer for the purpose of this invention the petroleum oil-soluble products thus obtained that have a molecular weight of less than 600.

To demonstrate the effectiveness of low molecular weight coumarone-indene polymers in stabilizing viscous mineral oil fractions against the deleterious effects of oxidation and also deterioration resulting from oxidation in the presence of metals, two typical low molecular weight coumarone-indene polymers were tested in typical hydrocarbon oils in the manner described below. These two materials, designated as "polymer A" and "polymer B," were obtained by controlled polymerization of the coumarone-indene-containing fraction, boiling from about 150° C. to about 200° C., of a coal tar distillate. "Polymer A" and "polymer B" had molecular weights of 450 and 330, respectively.

The moderately refined and solvent-refined oils which were tested below are oils which normally tend to deteriorate upon oxidation in the presence of metals, such, for example, as iron, copper, etc., with the formation of acid, sludge, and color bodies. The oil designated below as oil I was a mixed Mid-Continent and coastal distillate refined by treatment with 70 pounds of 98 per cent sulfuric acid per barrel, neutralized, washed and percolated through clay, and had a specific gravity of 0.879, flash point of 385° F., and a Saybolt Universal viscosity of 152 seconds at 100° F. Thus, oil I corresponds to a moderately refined oil. A solvent-refined oil described below as oil II was a distillate from a Rodessa crude refined with furfural, dewaxed, and filtered. It had a specific gravity of 0.856, flash point of 420, and a Saybolt Universal viscosity of 151 seconds at 100° F.

TEST I

Twenty-five-cc. samples of the oil and oil blends were heated to 200° F. with 5 liters of air per hour bubbling through them. Twenty-four inches of #18 gauge copper wire and 1 gram of iron granules were added to each sample, and 2 cc. of distilled water were added each day. The samples were tested for acidity, which is represented by neutralization number (N. N.), color, and sludge after varying periods of time, with the results given in Tables I and II.

TABLE I

*Acid-refined oil*

| Oil sample | Time, hours | N. N. | Lov. color | Sludge mg./25 cc. |
|---|---|---|---|---|
| Oil I alone | 72 | .14 | 6 | 68 |
|  | 168 | .99 | 25 | 17 |
|  | 240 | 2.5 | 110 | 246 |
|  | 336 | 16.0 | 400 | 1282 |
| Oil I+.5% polymer A | 161 | 0 | 1.5 | -- |
|  | 498 | .11 | 7.5 | 5 |
|  | 1,505 | 2.8 | 82 | 253 |
| Oil I+1% polymer A | 161 | .01 | 1.6 | -- |
|  | 498 | .06 | 4.8 | 7 |
|  | 1,002 | .01 | 20 | 74 |
|  | 2,010 | .09 | 67 | 134 |
| Oil I+.5% polymer B | 163 | .01 | 2.6 | 0 |
|  | 499 | 2.3 | 55 | 113 |
|  | 1,003 | 3.7 | 110 | 393 |
| Oil I+1% polymer B | 499 | .08 | 8 | 66 |
|  | 1,003 | .9 | 45 | 84 |
|  | 1,531 | 11.6 | 60 | 99 |

TALE II

*Furfural-refined oil*

| Oil sample | Time, hours | N. N. | Lov. color | Sludge mg./25 cc. |
|---|---|---|---|---|
| Oil II alone | 92 | 0.91 | 9 | 33 |
|  | 165 | 20.3 | 320 | 251 |
| Oil II+.5% polymer A | 164 | .06 | 1.5 | -- |
|  | 500 | 12.5 | 110 | 97 |
| Oil II+1% polymer A | 164 | .01 | 1 | -- |
|  | 500 | .01 | 1.2 | 26 |
|  | 1,508 | .04 | 5 | 19 |
|  | 2,012 | .33 | 8 | 32 |
| Oil II+.5% polymer B | 163 | .05 | .9 | 7 |
|  | 835 | 3.1 | 27 | 43 |
| Oil II+1% polymer B | 163 | .11 | 1 | 8 |
|  | 740 | .01 | 3 | 26 |
|  | 2,011 | .01 | 3 | 30 |

As aforesaid, the low molecular weight coumarone-indene polymers as described herein may be used in small amounts to inhibit the deleterious effects of oxidation without affecting the physical properties of the oils. The results shown in Table III effectively demonstrate that the low molecular weight polymers (A and B) used in the foregoing oxidation tests have no material effect upon the physical characteristics of the oil.

TABLE III

|  | Oil I | Oil I+1% polymer A | Oil I+1% polymer B |
|---|---|---|---|
| Saybolt vis. at 100° F | 152 | 155 | 154 |
| Saybolt vis. at 210° F | 42.6 | 42.8 | 42.5 |
| Viscosity index | 81 | 81 | 81 |
| Pour point, °F | 5 | 5 | 0 |

Thus, the foregoing results demonstrate effectively that the low molecular weight coumarone-indene polymers may be used in small amounts to stabilize viscous mineral oil fractions without materially changing their physical characteristics. As can be seen in the foregoing tables, the concentration of these polymers necessary to effect the desired inhibition of oxidation effects is small. The concentrations used will vary with the oil, conditions of use, etc., but in general, the desired results can be obtained with an amount of inhibitor ranging from about 0.1% to about 5.0% by weight of the oil.

It is to be understood that the procedures and examples described herein are illustrative only and not to be construed as limiting the scope of this invention. Correspondingly, though specific oils were described above, these oils are merely typical of the oils which may be used with the polymers herein disclosed. Thus, the use of all types of oils, as highly refined oils, moderately refined oils, solvent refined oils and modifications thereof are contemplated by this invention.

We claim:

1. An improved mineral oil composition comprising a viscous mineral oil fraction and in admixture therewith a minor proportion, sufficient to inhibit the deleterious effects of oxidation upon the oil, of a polymer having a molecular weight of from about 330 to about 450, said polymer selected from the group consisting of courmarone, indene, and mixtures of coumarone and indene.

2. An improved mineral oil composition comprising a viscous mineral oil fraction and in admixture therewith from about 0.1% to about 5.0% of a polymer having a molecular weight of from about 330 to about 450, said polymer selected from the group consisting of coumarone, indene, and mixtures of coumarone and indene.

3. An improved mineral oil composition comprising a viscous mineral oil fraction and in admixture therewith a minor proportion of a coumarone-indene polymer of molecular weight of from about 330 to about 450 in an amount sufficient to inhibit the deleterious effects of oxidation upon the oil.

4. An improved mineral oil composition comprising a viscous mineral oil fraction and in admixture therewith a coumarone-indene polymer of molecular weight of from about 330 to about 450 in an amount of from about 0.1% to about 5.0%.

5. An improved mineral oil composition comprising a viscous mineral oil fraction and in admixture therewith a minor proportion, sufficient to inhibit the deleterious effects of oxidation upon the oil, of a coumarone-indene polymer having a molecular weight of from about 330 to about 450, said coumarone-indene polymer obtained by polymerizing the coal tar fraction boiling from about 150° C. to about 200° C.

6. An improved mineral oil composition comprising a viscous mineral oil fraction and in admixture therewith from about 0.1% to about 5.0% of a coumarone-indene polymer having a molecular weight of from about 330 to about 450, said coumarone-indene polymer obtained by polymerizing the coal tar fraction boiling from about 150° C. to about 200° C.

7. An improved mineral oil composition comprising a viscous mineral oil fraction and in admixture therewith a minor proportion, sufficient to inhibit the deleterious effects of oxidation upon the oil, of a coumarone-indene polymer having a molecular weight of 450, said coumarone-indene polymer being obtained by polymerizing the coal tar fraction boiling from about 150° C. to about 200° C.

8. An improved mineral oil composition comprising a viscous mineral oil fraction and in admixture therewith a minor proportion, sufficient to inhibit the deleterious effects of oxidation upon the oil, of a coumarone-indene polymer having a molecular weight of 330, said coumarone-indene polymer being obtained by polymerizing the coal tar fraction boiling from about 150° C. to about 200° C.

GEORGE H. S. SNYDER.
EVERETT W. FULLER.